UNITED STATES PATENT OFFICE.

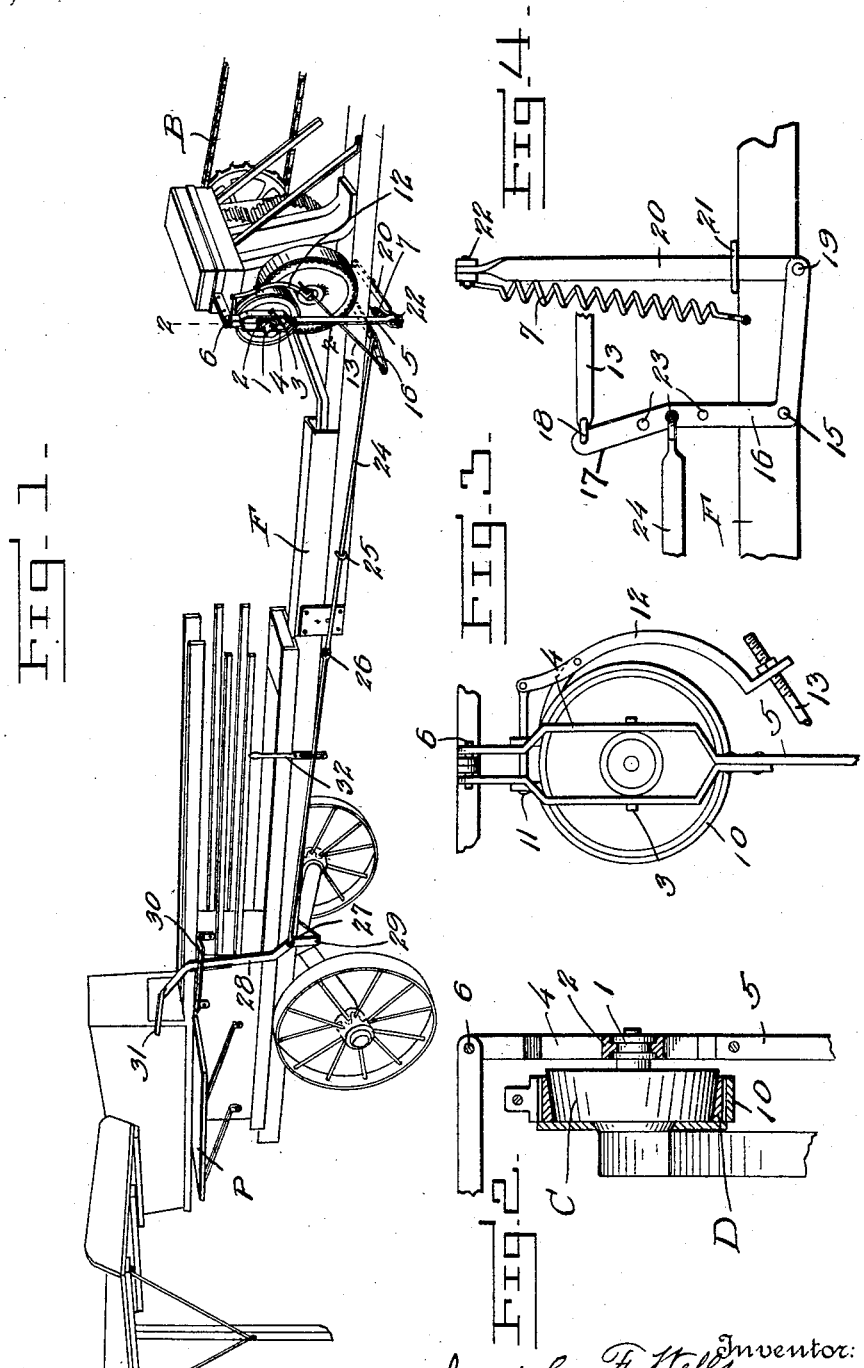

JOSEPH F. WELLS, OF PINKSTAFF, ILLINOIS, ASSIGNOR OF ONE-SIXTH TO FRANK S. LINDSAY AND ONE-SIXTH TO REDMOND H. EMMONS, BOTH OF PINKSTAFF, ILLINOIS.

CLUTCH AND BRAKE MECHANISM FOR BALING-PRESSES.

1,205,419.  Specification of Letters Patent.  Patented Nov. 21, 1916.

Application filed June 14, 1915. Serial No. 33,950.

*To all whom it may concern:*

Be it known that I, JOSEPH F. WELLS, a citizen of the United States, and resident of Pinkstaff, State of Illinois, have invented certain new and useful Improvements in Clutch and Brake Mechanism for Baling-Presses; and my preferred manner of carrying out the invention is set forth in the following full, clear, and exact description, terminating with a claim particularly specifying the novelty.

The present invention is an attachment for baling presses and the like, by means of which an operator at a convenient point can manipulate a lever to simultaneously cut off the power by opening the clutch, and also check the movements of the machine by applying a brake.

While the attachment is of course applicable to other machines than baling presses, and I reserve the right to so use it, I will herein describe it as adapted to this specific purpose.

Need for the attachment exists in baling presses because untoward conditions frequently arise which necessitate the quick cutting off of power and the equally sudden stopping of motion in the machine; and furthermore the attachment is described and claimed below in that form which it takes when applied to one of the common types of baling presses now in general use.

In the drawings hereto attached—Figure 1 is a general perspective view of a common type of baling press with this attachment applied, the motor being omitted and the power belt therefrom only appearing at the right; Fig. 2 is an enlarged vertical section on about the line 2—2 of Fig. 1; Fig. 3 is an enlarged detail of the loop for moving the clutch; and Fig. 4 is an enlarged bottom plan view of the bell-crank lever and the parts connected therewith.

In the drawings herewith is illustrated only so much of a well-known type of baling press as is necessary to a clear understanding of the invention, and I have lettered the feeder's platform P, the main frame F, the power belt B leading from the motor not shown, one clutch element as a cone C rotated constantly from the power wheel and belt, and the driven clutch element as a drum D which is connected with the pressing mechanism, although, as above suggested, this mechanism could be some other machine than a baling press.

Coming now to the present invention, the shaft of the cone carries a grooved wheel 1 surrounded by a ring 2, and the latter is pivoted by pins 3 within a loop 4 forming part of a lever 5 which is pivoted at its upper end to some fixed part of the machine at 6, while its lower end may be drawn normally inward by a spring 7 connecting it with the frame F. If this spring is employed, the clutch elements stand normally closed, and power is communicated from the belt B to the press unless the motor is stopped or the clutch opened. Surrounding some rotating member of said machine, as the drum D, is a band brake 10 having one end fixed as at 11 and the other end connected with a brake lever 12 and a rod 13 leads downward from this lever. The brake stands normally off the wheel so that the latter may run and the machine perform its function, but when the rod 13 is drawn down the brake is applied. Obviously some other form of brake could be employed, but this is typical and satisfactory.

Pivoted at 15 at its angle beneath the frame F is a bell crank lever 16 having one arm 17 projecting beyond the frame and connected at 18 with the rod 13 so that the latter leads thence obliquely upward to the brake lever 12. Pivoted to the other arm of the bell crank lever at 19 beneath the frame is a push rod 20 which may pass through a guide 21 on the frame, and its outer end is pivoted at 22 to the lower end of the clutch lever 5. Into one of a series of holes 23 in the arm 17 is linked a rod which leads along the main frame F, through guides 25 if desired, and this rod may have a joint or knuckle 26 within its length. Its remote end is pivoted at 27 to an upstanding lever 28 which is pivoted at its lower end at 29 to some fixed point; and this lever rises through or alongside the platform P, preferably alongside a rack bar 30, and carries a treadle 31 at its upper end standing within convenient reach of the operator's foot. Also the rod 24 is provided within reach of the attendant, with a hand lever 32 as shown in Fig. 1.

When now the machine is running, the parts of the clutch are closed. If anything should happen making it desirable that the pressing operation should cease, either operator can instantly move the rod 24—one by depressing the treadle 31 and the other by manipulating the hand lever 32. The result is that the bell crank lever 16 is turned on its pivot 15, the push rod 20 is projected, and the clutch lever 5 swung on its pivot 6 to open the clutch; and at the same time the arm 17 draws on the rod 13, and the brake is applied to stop the momentum of the drum D and therefore instantly stop the press without stopping the motor. Whichever operator actuated the rod 24, the lever 28 is moved and engaged with the rack bar 30, and therefore the parts are held in this position until it is disengaged therefrom by the operator upon the platform. If the spring 7 is employed it automatically restores the parts to their former position, and the press resumes its work; but if this spring is not used, one operator must move the rod 24 by hand to effect this result. Manifestly the use of this attachment puts it within the power of the feeder or the tender to instantly stop the press at any time without going to the clutch and disengaging it by hand, and this possibility will often avoid serious accidents to man and machine.

What I claim is:

A clutch and brake mechanism for baling presses comprising a clutch whose driving element is connected with a source of power and driven constantly and whose driven element is connected with the pressing mechanism, a clutch lever swinging in an upright plane and connected with said driven element, a band brake around said driven element, a bell crank lever pivoted to the machine frame and swinging in a horizontal plane, a push rod connecting one arm of the bell crank lever with the clutch lever, an oblique rod connecting the other arm of the bell crank lever with said brake band, and means for turning the bell crank lever on its pivot from a remote point whereby the clutch is opened and the brake applied, or the reverse.

In testimony whereof I have hereunto subscribed my signature this the 9th day of June, A. D. 1915.

JOSEPH F. WELLS.

Witnesses:
E. J. MILLER,
A. F. CONRAD.

Copies of this patent may be obtained for five cents each, by addressing the "Commissioner of Patents, Washington, D. C."